United States Patent [19]

King

[11] Patent Number: 5,443,096

[45] Date of Patent: Aug. 22, 1995

[54] PIPE REPAIR COUPLING

[76] Inventor: Robert King, 23122 8th St., Newhall, Calif. 91321

[21] Appl. No.: 329,292

[22] Filed: Oct. 26, 1994

[51] Int. Cl.⁶ .................... F16L 47/00; F16L 21/06
[52] U.S. Cl. ...................... 138/99; 138/162; 138/167; 285/373
[58] Field of Search ............... 138/99, 97, 162, 167, 138/166; 285/373, 419

[56] References Cited

U.S. PATENT DOCUMENTS

| | | | |
|---|---|---|---|
| 3,229,998 | 1/1966 | Pennington | 139/99 X |
| 3,406,987 | 10/1968 | Hunder et al. | 285/22 |
| 3,826,521 | 7/1974 | Wilhelmsen | 138/97 X |
| 3,971,574 | 7/1976 | Curtin | 285/31 |
| 4,109,944 | 8/1978 | Curtin | 285/373 |
| 4,260,181 | 4/1981 | Curtin | 138/99 X |
| 4,268,559 | 5/1981 | Smuckler | 138/99 X |
| 4,378,393 | 3/1983 | Smuckler | 138/99 X |
| 4,865,890 | 9/1989 | Erlichman | 428/35.1 |
| 5,007,666 | 4/1991 | Kyfes | 138/99 X |
| 5,022,685 | 6/1991 | Stiskin et al. | 285/45 |
| 5,256,226 | 10/1993 | Marzola et al. | 156/95 |

FOREIGN PATENT DOCUMENTS 407506  11/1946  Italy .

Primary Examiner—David A. Scherbel
Assistant Examiner—Patrick F. Brinson
Attorney, Agent, or Firm—Poms, Smith, Lande & Rose

[57] ABSTRACT

A pipe repair coupling comprising a pair of semi-circular separate and independent coupling segments. Each segment is identical in cross section, length, and width. When coupled together along one elongated edge in a snap fit relationship, the interconnected segments may be placed about a cylindrical pipe to repair a hole or the like therein, then squeezed together to lock along the other free elongated edges thereof. A suitable adhesive is applied between the coupling and the pipe being repaired prior to squeezing the segments together.

2 Claims, 2 Drawing Sheets

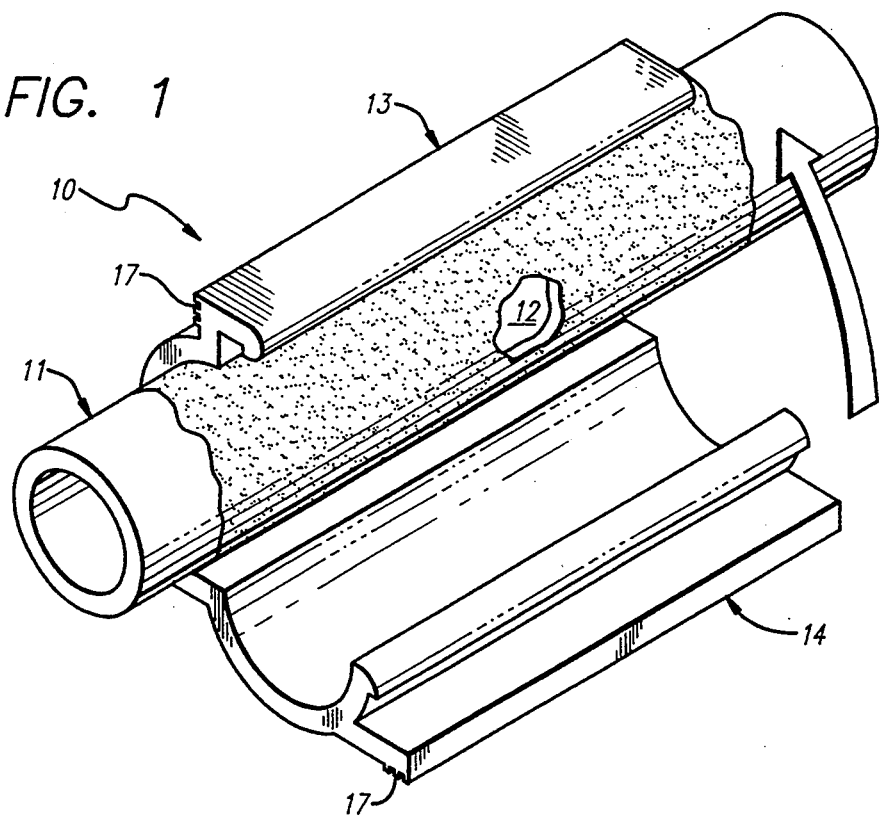
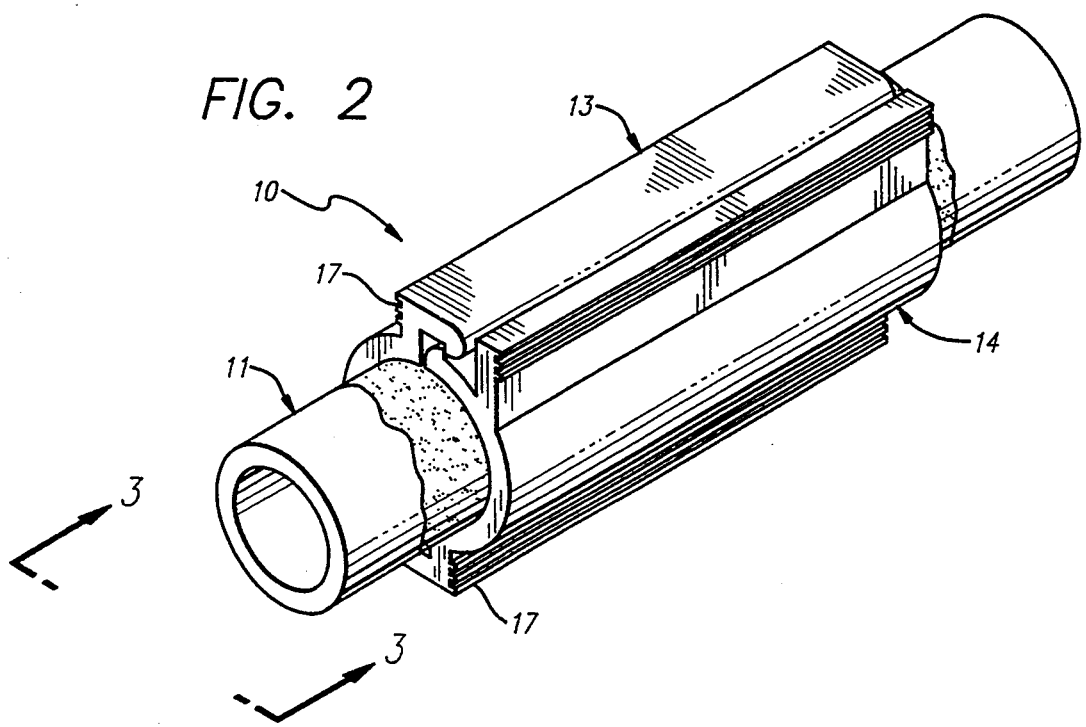

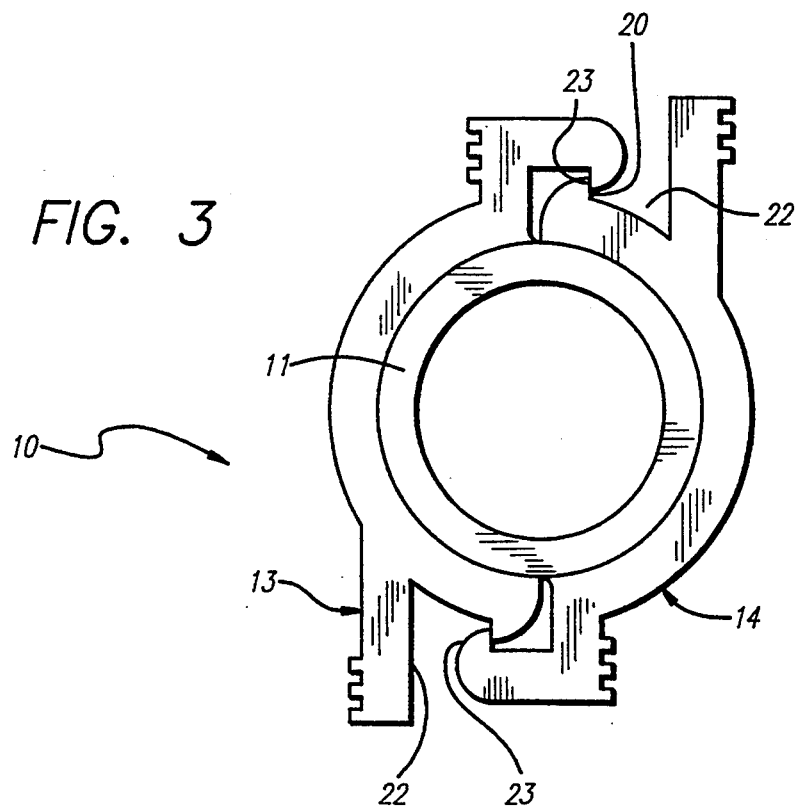
FIG. 3
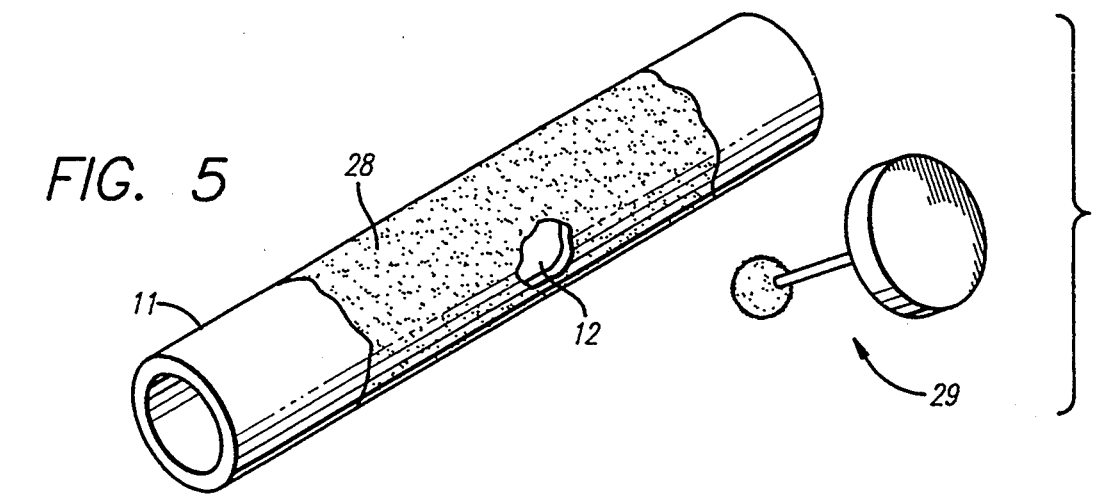
FIG. 4
FIG. 5

PIPE REPAIR COUPLING

BACKGROUND OF THE INVENTION

Field of the Invention

The invention relates to pipe repair couplings; and, more particularly, to a quick and easy pair of coupling segments which can be snapped together about a pipe being repaired.

Description of the Pertinent Art

Various types of couplings and methods have been suggested over the years. Conventional plastic pipe, such as PVC pipe, used in sprinkler systems or the like, must be repaired in situ in a quick and easily manner. Such repairs should result in a leak tight seal. Generally, such repairs may be made by unskilled homeowners who do not have sophisticated tools to make such repairs.

In U.S. Pat. No. 5,007,666 to Kyfec, semi-circular segments are used to join two pipe sections together. These segments have tongue and groove portions extending along their mating edges to interlock the same about abutting pipe sections. However, such interlock is not very positive and a clamp or vise grip pliers must be used to hold the interlocking edges together until the cement dries.

In U.S. Pat. No. 3,406,987, a pair of semi-circular sleeves are used to join ends of pipe sections together. One sleeve has channels along its elongated edges receiving therein in slidable relationship flanges along the elongated edges of the other sleeve. There is no positive interlocking of the segments and bolts are used to connect the edges. Since the two segments are not identical, they must be separately manufactured and added parts, e.g., bolts, are required.

There thus exists a need for a quick and easy coupling for repairing holes in plastic pipe without need for tools.

SUMMARY OF THE INVENTION

It is an object of this invention to provide an improved coupling for repairing a hole in plastic pipe in situ.

It is a further object of this invention to provide such a coupling which comprises two semi-circular parts that can be snap fit together and interlock about a cylindrical pipe.

It is still another object of this invention to provide a pipe repair coupling that assures a strong seal without need of holding the coupling in place.

These and other objects are preferably accomplished by providing a pipe repair coupling comprising a pair of semi-circular separate and independent coupling segments. Each segment is identical in cross section, length, and width. When coupled together along one elongated edge in a snap fit relationship, the interconnected segments may be placed about a cylindrical pipe to repair a hole or the like therein, then squeezed together to lock along the other free elongated edges thereof. A suitable adhesive is applied between the coupling and the pipe being repaired prior to squeezing the segments together.

BRIEF DESCRIPTION OF THE DRAWING

FIG. 1 is a perspective view of a coupling in accordance with the teachings of the invention disposed about a cylindrical pipe to be repaired prior to locking the segments of the coupling together;

FIG. 2 is a perspective view of the final installation position of the coupling of FIG. 1 about a cylindrical pipe;

FIG. 3 is an end view of the coupling and pipe of FIGS. 1 and 2 illustrating how one of the coupling segments interlocks with the other about a cylindrical pipe;

FIG. 4 is an end view of one of the coupling segments alone; and

FIG. 5 is a perspective view of the pipe alone of FIG. 1 being prepared for connecting the coupler of the invention thereto;

DESCRIPTION OF THE PREFERRED EMBODIMENT

Referring now to FIG. 1 of the drawing, a coupling 10 in accordance with the teachings of the invention is shown disposed about a cylindrical pipe 11. Pipe 11 has a hole 12 therein to be repaired and coupling 10 is comprised of a pair of interlocking semi-circular segments 13, 14 which, when in the fully interlocked position (FIG. 2), form a circular throughbore of a diameter generally related to the outer diameter of pipe 11.

Each segment 13, 14 is identical. As seen in FIG. 4, wherein only segment 13 will be discussed, each segment 13, 14 has a main elongated body portion 15 having an inner curved surface 16 adapted to conform to the outer cylindrical surface of pipe 11. As also seen in FIG. 1, each segment may have elongated ribs 17 on the exterior surface thereof.

As seen in FIG. 4, segment interlocking means 18, 19 are provided along the elongated edges of each segment 13, 14. First interlocking means 18 includes the lowermost end of body portion 15 terminating in an outwardly extending lip 20. Spaced above lip 20 in FIG. 4, a flange 21 extends outward from main body portion 15 and further outwardly than lip 20. Thus, an elongated slot 22, which may be V-shaped in cross section, is provided between lip 20 and flange 21.

The interlocking means 19 includes main body portion 15 terminating at its lowermost end in an inwardly extending lip 23. A ledge 24 is disposed above lip 23 and spaced therefrom which is formed by a continuation of main body portion 15 extending outwardly therefrom and downwardly to lip 23. Thus, an elongated slot 25 is formed between lip 23, ledge 24, the sidewall portion 26 interconnecting the same and a second elongated lip 27 which is an extension of inner wall 16.

FIG. 3 illustrates how lip 23 of one segment, e.g., segment 13, extends into slot 22 of the other segment 14., Thus, the lip 23 of one segment engages the lip 20 of the other segment.

As seen in FIG. 5, in operation, a suitable glue 28 is applied to pipe 11 using applicator 29 or any other suitable means. It is to be understood that pipe 11 has been cleaned about hole 12 to remove any dirt and foreign debris before applying glue. Preferably, the area of pipe to which coupling 10 will be applied should be clean and dry.

Thus, as seen in FIG. 5, any suitable adhesive 28 is generously applied to coat the entire surface to which coupling 10 will be applied. Next, one segment, as segment 13, FIG. 1, is placed over glued pipe 11, centered over the area to be repaired, and the second pipe segment 14 is snapped thereto as heretofore discussed. The two interlocking segments 13, 14 are now snapped together as seen in FIG. 2. It can be appreciated by comparing FIGS. 1, 2, and 3, that the lip 20 of segment 14 extends into slot 25 of segment 13 completing the interlocking as seen in FIG. 2.

These segments 13, 14 may be manually locked together or, if desired, may be squeezed together using conventional pliers or the like. Glue 28 is allowed to set and dry completely before the system of which pipe 11 is a part thereof is pressurized (usually about 30 minutes).

It can be seen that the unique positive snapping lock of segments 13, 14 assures a strong seal without any need to hold the interlocking segments 13, 14 in place. A stronger, faster and more permanent seal results than by using other repair couplings. If longer holes or cracks are present, more couplings may be used.

Any suitable size segments may be used dependent on the pipe outer diameter. Since the segments are identical, and of plastic, they may be quickly and easily economically manufactured. Thus, different sized couplings, e.g., for ½" outer diameter pipe, ¾" outer diameter pipe, etc. may be provided. Broken polyvinyl chloride pipe, conventionally used in sprinkler systems, may be quickly and easily repaired in situ. The pipe being repaired need not be cut to remove the damaged section. Repairs may be quickly and economically made, by spreading glue over the damaged area, and snapping on the mating coupling segments.

In conclusion, the difficulty encountered in using previous split couplings on plastic pipe in the past was that the two coupling halves had to be held together in some way while the cement set. This required an installer having a tireless grip hold the halves together until the cement set or the use of a pipe clamp over the two halves. The interlocking feature disclosed herein holds the two parts uniformly in contact with the pipe, because the coupling is held together along its entire length.

To effect a bond between plastic pipe and cemented plastic fittings or couplings, there must be a correct gap between the fitting or coupling, inside the wall and the pipe outside wall. Correctly sized, the gap should be large enough to allow the cement to fill the area between the pipe and fitting or coupling, but not too large a gap so that the cement cannot fill evenly and leaves voids. When the interlocking segments of applicant's coupling snap together, the user knows that the segments have been squeezed together sufficiently to leave the proper gap for the cement. The final snap, as seen in FIG. 2, is the indication that the coupling has been applied correctly.

Although a preferred embodiment of the invention has been disclosed, variations thereof may occur to an artisan and the scope of the invention is only limited by the scope of the appended claims.

I claim:

1. A pipe repair coupling for repairing a cylindrical pipe comprising:

a pair of interlocking semi-circular independent segments, each of said segments being adapted to interlock together and form a cylindrical throughbore conforming to the outside surface of a cylindrical pipe with no spacing between said outer surface and said throughbore, each of said segments being identical and comprising a main semi-circular elongated body portion having an inner curved surface with said body portion terminating in spaced elongated edges, one of said elongated edges having first interlocking means adapted to interlock with second interlocking means on the other of said elongated edges in snap fitting relationship whereby the first interlocking means of one of said segments may be snap fit into the second interlocking means of the other of said segments forming a longitudinal generally cylindrical throughbore therethrough, wherein said first interlocking means includes said main body portion terminating along one elongated edge in a single inwardly extending lip spaced from a ledge integral with both said main body portion at one end, said lip interconnected to said ledge by a sidewall portion at an opposite end of the ledge, said ledge extending outwardly from said main body portion in a direction opposite said lip forming a first elongated slot therebetween, and said second interlocking means includes said main body portion terminating along its other elongated edge in a single outwardly extending lip spaced from a flange extending from and integral with said main body portion in the same direction as said second mentioned lip, the spacing between said second mentioned lip and said flange forming a second elongated slot therebetween, whereby, when said first and second coupling segments are interlocked together, said first mentioned lip on one of said segments snap fits into said second elongated slot on the other of said segments and the first mentioned lip on the other of said segments snap fits into the second elongated slot on said one of said segments.

2. A method for repairing a hole or crack in cylindrical plastic pipe comprising the steps of:

cleaning said pipe around the area to be repaired until said area is clean and dry;

applying a glue suitable to secure plastic parts together about the area of said pipe to be repaired coating the entire surface that is to be covered by a pipe repair coupling comprised of a pair of interlocking semi-circular segments over said pipe;

taking a first and second pair of semi-circular coupling segments each having a main semi-circular elongated body portion with an inner curved surface, the body portion terminating in spaced elongated edges having first interlocking means adapted to interlock with second interlocking means on the other of said elongated edges in snap fitting relationship; and snap fitting the first interlocking means of one of said segments into the second interlocking means of the other of said segments and snap fitting the second interlocking means of said one of said segments thereby may be snap fit into the first interlocking means on the other of said segments forming a longitudinal generally cylindrical throughbore therethrough with no spacing between the outer surface of said cylindrical pipe and the cylindrical throughbore, the step of taking a first and second pair of semi-circular coupling segments including the step of taking segments each of which has first interlocking means including said main body portion terminating along one elongated edge in a single inwardly extending lip spaced from a ledge integral with said main body portion at one end, said lip interconnected to said said ledge by a sidewall portion at an opposite end of the ledge, said ledge extending outwardly from said main body portion in a direction opposite said lip forming a first elongated slot therebetween, and said second interlocking means includes said main body portion terminating along its other elongated edge in a single outwardly extending lip spaced from a flange extending from and integral with said main body portion in the same direction as said second mentioned lip, the spacing between said second mentioned lip and said flange forming a second elongated slot therebetween, the step of interlocking said segments including the step of snap fitting said first mentioned lip on one of said segments into said second elongated slot on the other of said segments and snap fitting the first mentioned lip on the other of said segments into the second elongated slot on said one of said segments.

* * * * *